April 17, 1962   J. L. BREESE   3,029,803
HEATER FOR CONTRACTOR'S USE
Filed Aug. 17, 1955

INVENTOR.
James L. Breese
BY
PARKER & CARTER
ATTORNEYS 3,029,803
HEATER FOR CONTRACTOR'S USE
James L. Breese, Santa Fe, N. Mex., assignor, by mesne assignments, to Controls Company of America, Schiller Park, Ill., a corporation of Delaware
Filed Aug. 17, 1955, Ser. No. 528,957
3 Claims. (Cl. 126—110)

The present invention is directed to a new and improved heater construction utilizing vaporizing pot type burners and hydrocarbon fuels.

One purpose of the present invention is the provision of an improved heater construction and an improved method of preheating air which is delivered to a pot type liquid fuel burner within the heater.

Another purpose of the present invention is the provision of an improved heater construction which facilitates preheating of air delivered to a burner pot within the heater and improves the performance of the heater.

Other objects will appear from time to time in the course of the ensuing specification and claims.

Referring generally now to the drawings.

Like elements are designated by like characters throughout the specification and drawings.

Figure 2:
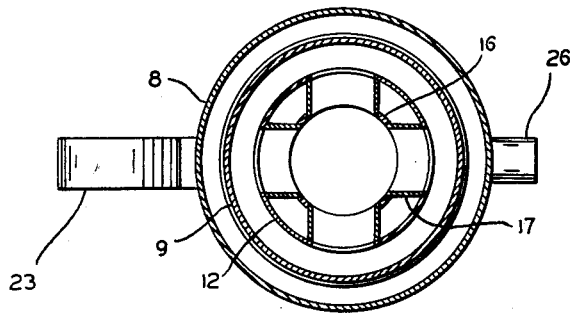
FIGURE 2 is a sectional view of the heater shown in FIGURE 1 looking in the direction of the arrows 2—2 of FIGURE 1.
Figure 1:
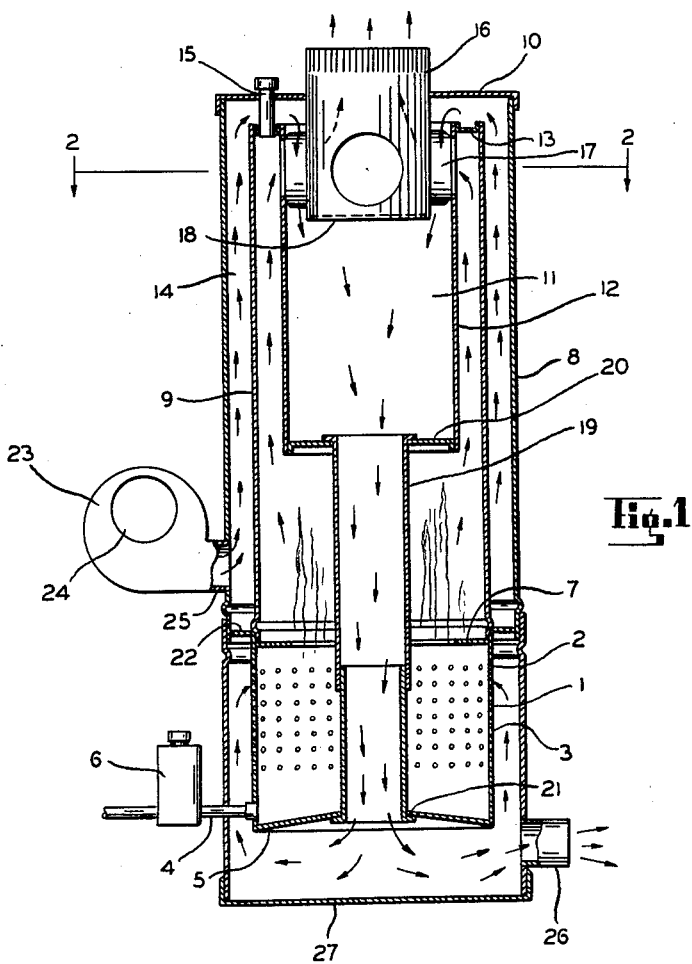
FIGURE 1 is a side elevation in section of my improved heater construction.

Referring specifically now to the drawings and in the first instance to FIGURE 1, I designate a pot type liquid fuel burner 1. The burner 1 may be of any suitable and conventional type and it includes rows of apertures 2 and 3 which are spaced vertically and are adapted for the admission of primary air and secondary air to the interior of the pot. A fuel inlet 4 is adapted to supply a hydrocarbon liquid fuel to the pot and is shown as located adjacent the pot bottom 5. Any suitable mechanism 6 may be provided for regulating the flow of fuel to the pot.

The pot may include an upper baffle 7 and it may be provided with any suitable pilot baffle construction (not shown) and any suitable mechanism or instrumentality for igniting the mixture of fuel and air within the pot (not shown).

The burner pot 1 is located in the lower portion of an upright jacket or casing 8. It should be noted that the wall of the burner pot is spaced from the interior wall of the jacket 8 so as to define a passage for air between the jacket 8 and the pot wall 1. The bottom 5 of the pot is advantageously spaced upwardly from the bottom of the jacket as is illustrated in FIGURE 1, so that the primary and secondary air apertures communicate with the space beneath the pot.

A generally cylindrical combustion drum 9 extends upwardly from the upper portion of the burner pot 1 to a point spaced from the upper wall 10 of the jacket 8.

A plenum chamber 11 is defined by a cylindrical member 12 which is supported in the upper portion of the drum 9. A closure ring 13 may be provided between the cylinder 12 and the drum 9 at their upper extremities so as to close off communication between the space exterior to the cylinder 12 and the space 14 between the jacket 8 and drum 9. An observation port 15 may be formed in the upper wall 10 of the jacket and the ring 13 so as to allow the user of the heater to observe the progress of burning within the drum 9.

A stack member 16 is supported in the upper portion of the cylinder 12 and communicates with the atmosphere. A plurality of circumferentially spaced inlet pipes 17 extend between the stack 16 and the space between the cylinder 12 and drum 9. The stack member 16 may be supported on the pipes 17 which are in turn supported on the cylinder 12. The bottom of the stack as indicated at 18 is closed.

Extending downwardly from the plenum chamber 11 is a pipe 19. The pipe 19 may be supported on the lower wall 20 of the plenum chamber. The pipe 19 is positioned along the axis of the burner pot 1 and extends through the burner pot so as to establish communication between the space below the pot bottom and the plenum chamber 11. The lower end of the pipe 19 may be secured to the bottom of the pot as at 21.

In order to divide the upper portion of the space between the drum 9 and jacket 8 from the space between the pot 1 and jacket 8, I may employ any suitable circumferentially extending baffle 22. The baffle 22 may be positioned adjacent the upper portion of the pot to close off the space 14 from the space exterior to the burner pot 1.

In order to direct a forced stream of atmospheric air into the heater and into the pot, I employ a blower which is diagrammatically illustrated at 23. The blower 23 has an inlet as at 24 and an outlet 25 connected to the jacket 8 above the baffle 22 so as to force atmospheric air into the space between the drum 9 and jacket 8.

A hot air outlet 26 is formed in the lower portion of the jacket 8 and communicates with the space between the pot bottom and the bottom wall 27 of the jacket 8.

The outlet 26 may be connected to any suitable conduit system for conveying hot air to any location where heat is desired.

Whereas I have shown and described a preferred form of my invention, I wish it to be understood that there are many modifications to the invention which will fall within the scope and spirit of the invention and which will be apparent to those skilled in the art. The description and drawings should be taken in an illustrative or diagrammatic sense only and not in any limiting sense. The scope of the invention should, therefore, be limited only by the scope of the hereinafter appended claims.

The use and operation of my invention are as follows:

I employ a heater and burner pot construction which utilizes a blower system for forcing atmospheric air into the pot for combustion. The heater jacket is so formed as to direct the air delivered by the blower 23 upwardly between the jacket 8 and the combustion drum 9 where it enters the plenum chamber 11 through the spaces between the pipes 17. When combustion is initiated in the pot and burning takes place within the pot and within the combustion drum 9, the products of combustion pass upwardly within the combustion drum 9 and heat the wall of the drum 9. Thus heat transfer takes place between the drum 9 and the air circulating around the drum 9. The products of combustion are discharged through the pipes 17 and through the stack portion 16. The products of combustion also heat the walls 12 and 20 which define the plenum chamber. Thus heat transfer also takes place between the walls 12 and 20 and the air within the plenum chamber 11. It should be noted that the plenum chamber 11 is generally enlarged with respect to the pipe 19 so as to contain a comparatively large volume of air.

Thus the air delivered by the blower 23 takes a comparatively long path before it passes to the apertures 3. This path is on the order of twice the length of the heater and heat of combustion is transferred to the air throughout the majority of this path.

The preheated air passes beneath the pot bottom 5 and upwardly into the space between the pot 1 and the jacket 8. This air is then delivered through the primary and secondary air apertures resulting in improved vaporization of the fuel and improved combustion within the pot 1 and drum 9.

The air is heated to a relatively high temperature and some of the air so heated may be delivered through the outlet pipe 26 to any suitable location where heat is desired. It should be understood that suitable piping will be employed in connection with the outlet 26 to convey heated air to such a location.

Thus with this form of heater construction I am not only able to improve combustion by preheating the air used for combustion, but I am also able to divert a portion of this heated air at its maximum temperature to any desired location.

I claim:

1. An oil burning heater construction including an upstanding jacket having bottom and side walls and a vaporizing pot type burner positioned in the lower portion of said jacket and in spaced relation to said bottom and side walls, means for delivering a forced stream of air into said jacket, a combustion drum extending upwardly from the burner and in spaced relation to the side of the jacket, a cylinder defining a plenum chamber supported in spaced relation in the upper portion of said drum, an outlet for products of combustion positioned in the upper portion of said chamber and communicating with the space between said cylinder and said drum, means establishing a preheating air passageway extending downwardly through the bottom of said burner pot for establishing communication between the plenum chamber and the space between the pot and jacket, and a baffle positioned between the upper portion of said pot and said jacket to thereby divide the space between the jacket side wall, burner pot and combustion drum into an upper passageway communicating with said first named means and a lower passageway communicating with said burner pot and said last named means.

2. The structure of claim 1 wherein said first named means includes a blower having an outlet connected to discharge a forced stream of air into said upper passageway at a point just above said baffle.

3. The structure of claim 1 wherein said plenum chamber includes a bottom wall enlarged with respect to said preheating air passageway and opposed to the flame and products of combustion within said drum thereby spreading the flame and products of combustion laterally against the wall of the combustion drum.

References Cited in the file of this patent

UNITED STATES PATENTS

| 1,983,111 | Whitehurst | Dec. 4, 1934 |
| 2,156,101 | Willett et al. | Apr. 25, 1939 |
| 2,263,098 | Mueller | Nov. 18, 1941 |
| 2,561,934 | Mayo | July 24, 1951 |
| 2,614,618 | Chadwick et al. | Oct. 21, 1952 |

FOREIGN PATENTS

| 492,839 | Canada | May 12, 1953 |
| 969,596 | France | May 24, 1950 |